US010546369B2

(12) United States Patent
Deng et al.

(10) Patent No.: US 10,546,369 B2
(45) Date of Patent: Jan. 28, 2020

(54) EXPOSURE LEVEL CONTROL FOR HIGH-DYNAMIC-RANGE IMAGING, SYSTEM AND METHOD

(71) Applicant: OmniVision Technologies, Inc., Santa Clara, CA (US)

(72) Inventors: Fanbo Deng, Singapore (SG); Chengming Liu, Fremont, CA (US); Sarvesh Swami, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 133 days.

(21) Appl. No.: 15/865,880

(22) Filed: Jan. 9, 2018

(65) Prior Publication Data
US 2019/0213718 A1 Jul. 11, 2019

(51) Int. Cl.
*G06K 9/38* (2006.01)
*G06T 5/00* (2006.01)
*H04N 5/235* (2006.01)
*H04N 1/407* (2006.01)
*H04N 5/341* (2011.01)

(52) U.S. Cl.
CPC .............. *G06T 5/009* (2013.01); *H04N 1/407* (2013.01); *H04N 5/2355* (2013.01); *H04N 5/341* (2013.01); *G06T 2207/20208* (2013.01)

(58) Field of Classification Search
None
See application file for complete search history.

(56) References Cited

U.S. PATENT DOCUMENTS

| 9,204,056 | B2 * | 12/2015 | Kaizu | H04N 5/2353 |
| 9,521,351 | B1 * | 12/2016 | Endsley | H04N 5/378 |
| 9,769,391 | B2 * | 9/2017 | Oshima | G03B 7/091 |
| 9,800,796 | B1 * | 10/2017 | Zhang | H04N 5/2355 |
| 9,916,644 | B1 * | 3/2018 | Swami | G06T 7/194 |
| 10,223,775 | B2 * | 3/2019 | Swami | G06T 5/002 |
| 2009/0231449 | A1 * | 9/2009 | Tzur | H04N 5/145 |
| | | | | 348/208.6 |

(Continued)

OTHER PUBLICATIONS

Enhancing resolution—Pixels, Srinivasa G Narasimhan et al., IEEE, 0162-8828, 2005, pp. 518-530 (Year: 2005).*

(Continued)

*Primary Examiner* — Jayesh A Patel
(74) *Attorney, Agent, or Firm* — Lathrop Gage LLP

(57) ABSTRACT

A method for determining exposure levels of an image-sensor pixel array includes (a) storing a first plurality of pixel values representing a first captured image, captured with the image sensor in an applied exposure configuration, each distinct region of the pixel array having a respective first exposure level, (b) determining pixel-value global statistics, (c) estimating, from the global statistics, a global pixel value of the first captured image, (d) determining, for each distinct region, a respective local statistics of the first pixel values, (e) assigning, to each distinct region, a respective scale factor based on the local statistics of the distinct region, (f) determining a refined exposure configuration including, for each distinct region, a second exposure level proportional to a product of its respective first exposure level and its respective scale factor, and (g) capturing second pixel values with the image sensor configured in the refined exposure configuration.

22 Claims, 11 Drawing Sheets

(56) References Cited

U.S. PATENT DOCUMENTS

2017/0195596 A1* 7/2017 Vogelsang ............. H04N 5/347
2018/0359410 A1* 12/2018 Ain-Kedem ......... H04N 5/3532
2019/0156516 A1* 5/2019 Nikkanen ................ G06T 7/80

OTHER PUBLICATIONS

ICAM06: A refined image appearance model for HDR image rendering. Jiangtao Kuang et al. Elsevier, 1047-3203, 2007, pp. 406-414 (Year: 2007).*
Taiwan Patent Application No. 107140258, English translation of Office Action dated Jun. 28, 2019, 4 pages.
Narasimhan et al. (Apr. 2005) "Enhancing Resolution Along Multiple Imaging Dimensions Using Assorted Pixels," IEEE Transactions on Pattern Analysis and Machine Intelligence, vol. 27, No. 4, pp. 518-530.

* cited by examiner

EXPOSURE LEVEL CONTROL FOR HIGH-DYNAMIC-RANGE IMAGING, SYSTEM AND METHOD

BACKGROUND

Many consumer electronics products include at least one camera. These products include tablet computers, mobile phones, and smart watches. In such products, and in digital still cameras themselves, high-dynamic range (HDR) functionality enables imaging of scenes having an increased dynamic range of luminosity. The cameras include an image sensor having many pixels arranged as a pixel array. One way to capture an HDR image is for the image sensor to have a spatially-varying exposure level across the pixel array when the camera captures the image.

SUMMARY OF THE EMBODIMENTS

In one aspect, a method for determining exposure levels of a pixel array of an image sensor is disclosed. The method includes steps of (a) storing, in memory, a first plurality of pixel values representing a first captured image, captured with the image sensor in an applied exposure configuration, in which each of a plurality of distinct regions of the pixel array has one of a plurality of first exposure levels, (b) determining global statistics of the first plurality of pixel values, (c) estimating, based on the global statistics, a global pixel value of the first captured image, and (d) determining, for each of the plurality of distinct regions, a respective one of a plurality of local statistics, of the first plurality of pixel values. When the estimated global pixel value differs from a reference pixel-value by less than a predetermined threshold, the method includes (e) assigning, to each of the plurality of distinct regions, a respective one of a plurality of scale factors based on the local statistics of the distinct region. The method also includes (f) determining a refined exposure configuration including, for each of the plurality of distinct regions, a second exposure level proportional to a product of its respective first exposure level and its respective scale factor, and (g) capturing a second plurality of pixel values with the image sensor configured in the refined exposure configuration.

In an aspect, an exposure controller for capturing a high-dynamic range image is disclosed. The exposure controller includes a memory and a microprocessor. The memory stores non-transitory computer-readable instructions and is adapted to store the high-dynamic range image. The microprocessor is adapted to execute the instructions to implement the aforementioned method.

DETAILED DESCRIPTION OF THE EMBODIMENTS

Figure 1:
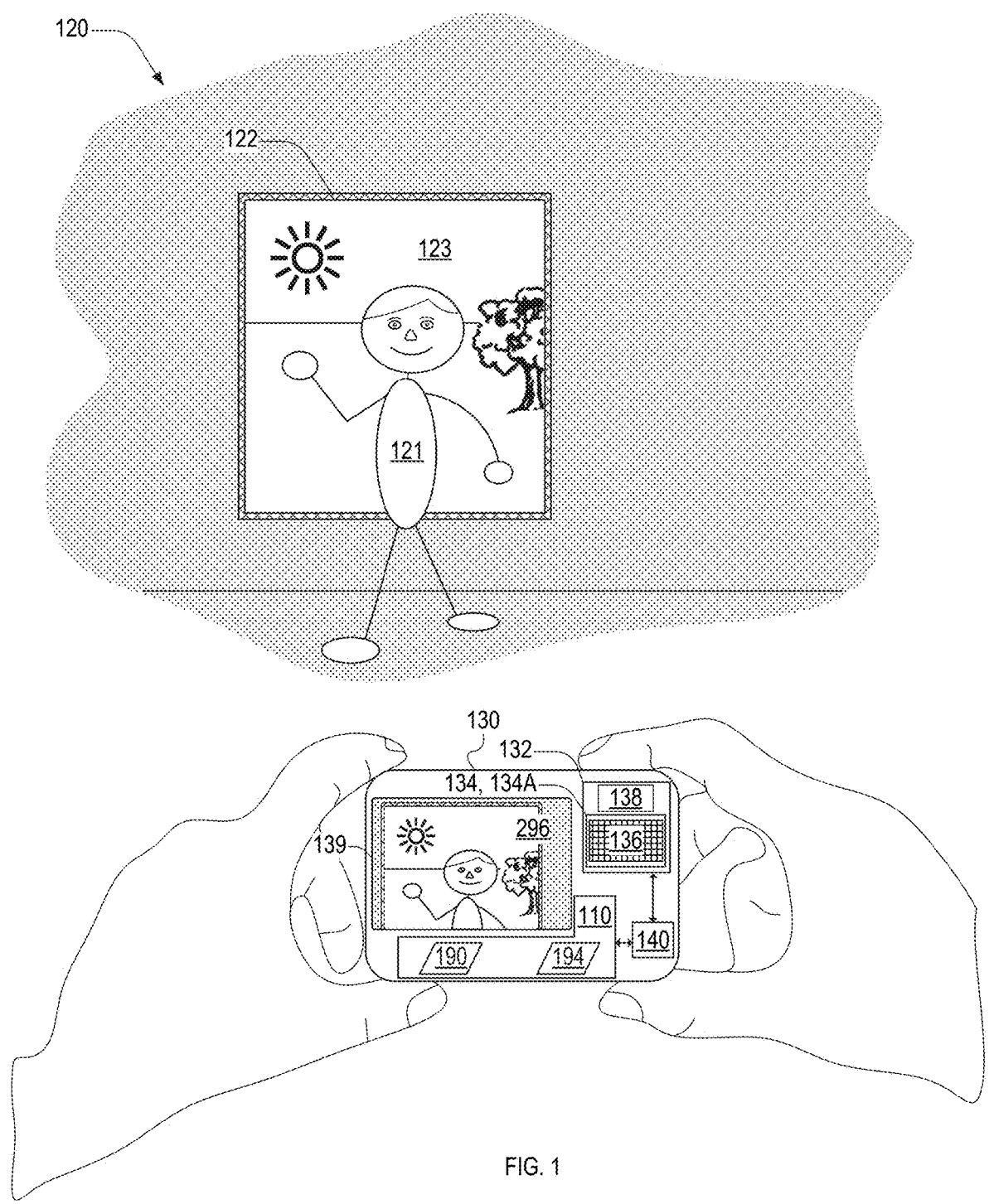
FIG. 1 depicts a camera imaging a scene having a high dynamic range of luminance.

FIG. 1 depicts a camera 130 imaging a scene 120 having a high dynamic range of luminance. Scene 120 includes a person 121 in front of a window 122, through which a sunny scene 123 is visible. Camera 130 includes an imaging lens (not shown), an image sensor 132, a memory 110, and a microprocessor 140 communicatively coupled to image sensor 132. Image sensor 132 includes a pixel array 134A, which may have a color filter array (CFA) 136 thereon. Pixel array 134A includes a plurality of pixels 134, not shown in FIG. 1 for clarity of illustration. Each color filter of CFA 136 is aligned with a respective pixel 134 of pixel array 134A. The imaging lens images scene 120 onto image sensor 132. Image sensor 132 also includes circuitry 138 that includes at least one analog-to-digital converter.

When imaging scene 120, pixel array 134A is configured to have an applied exposure configuration 190. Each pixel 142 has a respective pixel charge corresponding to a respective intensity of light from a scene 120 imaged onto pixel array 134A. Circuitry 138 converts each pixel charge to a respective one of a first plurality of pixel values 194, which are stored in memory 110. Camera 130 may include a display 139 configured to display pixel values 194 as a first captured image 296. Display 139 may display pixel values 194 as a live preview.

In scene 120, indoor lighting, not shown, illuminates the front of person 121 facing the camera while sunlight illuminates sunny scene 123. Hence, person 121 and sunny scene 123 have respective differing luminosities. Since the direct sunlight is typically significantly brighter than the indoor lighting, luminosity of sunny scene 123 far exceeds luminosity of person 121 such that scene 120 has a high dynamic range of luminosity. Standard digital imaging enables capture of scene 120 using a single exposure time optimized for either (but not both) luminosity of person 121 or sunny scene 123. When the exposure time is optimized for luminosity of person 121, person 121 is properly exposed while sunny scene 123 is overexposed. When the exposure time is optimized for luminosity of sunny scene 123, sunny scene 123 is properly exposed while person 121 is underexposed.

Figure 2:
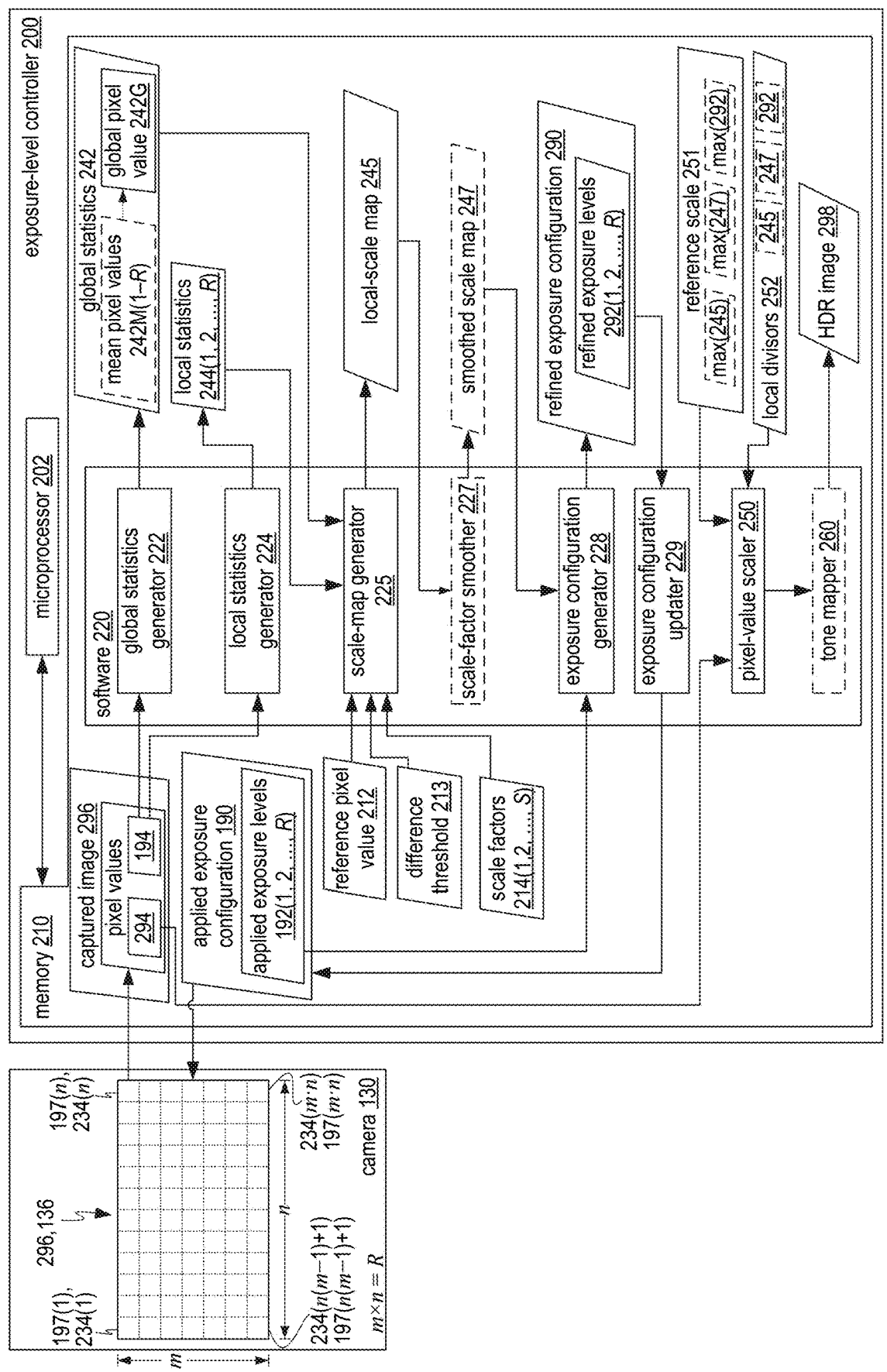
FIG. 2 shows an example exposure-level controller for high-dynamic range imaging, in an embodiment.

FIG. 2 shows an example exposure-level controller 200 for generating an HDR image 298. Exposure-level controller 200 may be implemented within camera 130.

Exposure-level controller 200 includes a microprocessor 202 and a memory 210 that stores software 220 that includes computer-readable instructions. Microprocessor 202 may be a digital signal processor such as an image processor. Memory 210 may be transitory and/or non-transitory and may include one or both of volatile memory (e.g., SRAM, DRAM, VRAM, or any combination thereof) and nonvolatile memory (e.g., FLASH, ROM, magnetic media, optical media, or any combination thereof).

Memory 210 and microprocessor 202 may function as memory 110 and microprocessor 140, respectively, of camera 130, FIG. 1. Microprocessor 202 is adapted to execute the instructions to perform functions of exposure-level controller 200 as described herein. Memory 210 may store at least one of pixel values 194, pixel-values 294, applied exposure configuration 190, global statistics 242, local statistics 244, a plurality of scale factors 214, a refined exposure configuration 290, captured image 296, and an HDR image 298. Global statistics 242 may include a global pixel-value 242G, which is, for example, a statistical average of pixel values 194. Pixel-values 194, 294 and HDR image 298 may be stored in memory 210 in either an image file format, such as JPEG and TIFF, or a raw image format, such as TIFF/EP and Digital Negative (DNG). Pixel values 194, 294 and HDR image 298 may be stored in a same format or a different format. In an embodiment, at least one of pixel values 194, 294, and captured image 296 are stored in a volatile memory of memory 210, and HDR image 298 is stored in a nonvolatile memory of memory 210.

Pixel array 134A includes a plurality of pixel subarrays 234(1, 2, . . . , R), where R is a positive integer. For example, the R pixel subarrays 234 may be arranged in an m×n array, where m and n are positive integers and R=m·n. Captured image 296 may be divided into a plurality of regions 197(1, 2, . . . , R), such that each region 197(i) corresponds to a respective pixel subarray 234(i) of pixel array 134A, where integer i satisfies 1≤i≤R.

Applied exposure configuration 190 and refined exposure configuration 290 include, respectively, a plurality of applied exposure levels 192(1, 2, . . . , R) and a plurality of refined exposure levels 292(1, 2, . . . , R). Each first exposure level 192(i) and refined exposure level 292(i) corresponds to both (1) a respective pixel subarray 234(i), and (2) a respective region 197(i). Each exposure level 192(1-R) may correspond to a different exposure time assigned to respective pixel subarray 234(1-R). The number of regions R of captured image 296 may exceed the number of scale factors S of scale factors 214. Herein, notation ($N_1$-$N_2$) following a reference numeral is shorthand for denoting the range ($N_1$, $N_1$+1, . . . $N_2$-1, $N_2$), where $N_1$ and $N_2$ are integers.

Software 220 includes one or more of the following software modules that when executed by the microprocessor 202 produce respective data outputs: a global statistics generator 222, a local statistics generator 224, a scale-map generator 225, a scale-factor smoother 227, an exposure configuration generator 228, an exposure configuration updater 229, a pixel-value scaler 250, and a tone mapper 260.

Global statistics generator 222 is configured to generate global statistics 242 from pixel values 194. Global statistics generator 222 may generate global pixel-value 242G by executing an exposure metering technique including at least one of spot metering, partial area metering, center-weighted average metering, and multi-zone metering.

Local statistics generator 224 is configured to generate local statistics 244(1, 2, . . . , R) from pixel values 194. Scale-map generator 225 is configured to, when global pixel-value 242G differs from reference pixel-value 212 by less than a difference threshold 213, generate a local-scale map 245 from local statistics 244 and scale factors 214(1, 2, . . . , S), where scale-factor count S is a positive integer. Difference threshold 213 may be a relative difference between global pixel-value 242G and reference pixel-value 212. The relative difference is, for example, in the range of one to five percent of either reference pixel-value 212, global pixel-value 242G, or an average thereof.

Reference pixel-value 212 is, for example, a statistical average pixel value corresponding to desired global image properties, such as brightness and/or contrast. Reference pixel-value 212 may be a statistical average pixel values of one or more previously captured images, such that scale-map generator executes only when a sequence of captured images (or a predetermined number of most-recent captured images of the sequence) satisfies a convergence criterion. The convergence criterion may be based on one or more statistical average pixel values, and/or, more generally, global statistics 242 (e.g., 242G) corresponding to each of the sequence of captured images.

Scale-map generator 225 is configured to generate a local-scale map 245 from scale factors 214 and local statistics 244. Local-scale map 245 is a mapping of each pixel subarray 234 to one of scale factors 214. Local-scale map 245 may be stored in memory 210 as an m×n array, corresponding to the m×n array of pixel array 134A and captured image 296, where each array element is one of scale factors 214. Local-scale map 245 may be stored in memory 210 as a look-up table. The look-up table, for example, maps each scale factor 214 to at least one pixel subarray 234 or maps each pixel subarray 234 to one of scale factors 214(1-S).

In an embodiment, scale factors 214 consists of factors $\{a_1, a_2, \ldots, a_S\}$ where $a_{j-1} < a_j < a_{j+1}$ and integer scale-factor index j satisfies 1≤j≤S. Large values of scale-factor count S are beneficial for better optimization of exposure levels for different regions of pixel array 134A. Yet, such large values of S increases computational load and hence slows down processes executed by exposure-level controller 200 described herein. The tradeoff between discreteness of exposure levels and computational efficiency is well balanced when S is between four and eight, inclusive. For example, scale-factor count S equals five and scale factors 214 include scale-factors $\{1, 2, 4, 8, 16\}$. Scale-factor count S may be less than the number of pixel subarrays R such that more than one pixel subarray 234 is associated with the same scale factor 214.

Software 220 may include a scale-factor smoother 227, which is configured to decrease a maximum difference between integer scale-map indices of all pairs of adjacent map regions of local-scale map 245, which yields a smoothed scale map 247. Scale-factor smoother 227 may employ at least one of the following image processing operators: an erosion operator and a dilation operator, and other operators of mathematical morphology.

Exposure configuration generator 228 is configured to generate refined exposure configuration 290, which includes refined exposure levels 292(1, 2, . . . , R). For region i of captured image 296, each refined exposure level 292(i) is, for example, proportional to or equal a product of its corresponding first exposure level 192(i) and a scale map value corresponding to region i, where the scale map is either local-scale map 245 or smoothed scale map 247.

Exposure configuration updater 229 is configured to update applied exposure configuration 190 to be equal to refined exposure configuration 290. Camera 130 is configured to capture a second plurality of pixel-values 294, with image sensor 132 configured in refined exposure configuration 290. Memory 210 may overwrite pixel values 194 with second plurality of pixel-values 294 or may store the second plurality of pixel-values 294 in addition to pixel values 194.

The maximum value of scale factor 214 associated with any pixel subarray 234(i) may be determined to optimize signal-to-noise ratio and prevent saturation of pixel-values 294 generated by image sensor 132 when configured in refined exposure configuration 290. Such a determination may depend on bit-depth n of pixel-values 294 and a statistical maximum value of local statistics 244(i) corresponding to pixel subarray 234(i). For example, scale-map generator 225 assigns one of scale factors 214 to pixel subarray 234(i) to be the largest of scale factors 214 that is less than $(2^n-1)$ divided by the statistical maximum pixel value of pixel subarray 234(i). The statistical maximum value of pixel subarray 234(i) is, for example, one of a smooth maximum, quantile maximum, and maximum after removing outliers. Local statistics 244(i) may include the statistical maximum value of pixel subarray 234(i).

As illustrative example, image sensor 132 is a ten-bit sensor (n=10), and hence each pixel 134 has a maximum pixel-value 294 equal to $(2^{10}-1)$, or 1023. When the statistical maximum pixel value is two-hundred fifty, scale factor 214 is the largest integer less than $(2^{10}-1)$ divided by two-hundred fifty, such that scale factor 214 equals four.

Pixel-value scaler 250 is configured to scale pixel-values 294 according to a reference scale 251 and a plurality of local divisors 252 to produce HDR image 298. Reference scale 251 is, for example, a maximum value of scale factors 214, smoothed scale map 247, or refined exposure levels 292. Local divisors 252 are, for example, one of local-scale map 245, smoothed scale map 247, and refined exposure levels 292.

Figure 3:
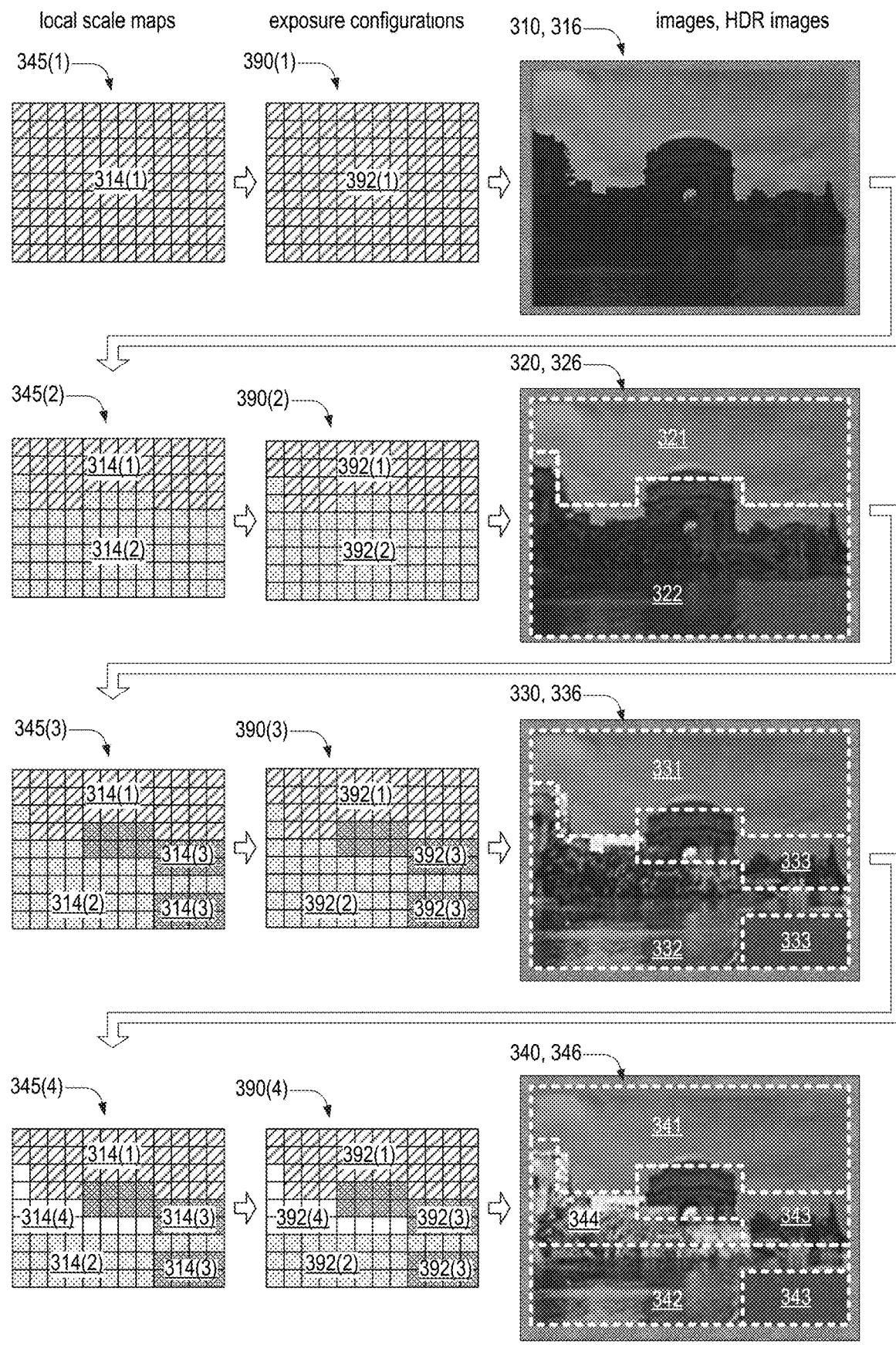
FIG. 3 illustrates captured images produced from respective local-scale maps and respective exposure configurations produced by the exposure selector of FIG. 2.

FIG. 3 illustrates captured images 310-340 produced from respective local-scale maps 345(1-4) and respective exposure configurations 390(1-4). Captured images 310-340 are each examples of captured image 296. Captured images 320, 330, and 340 are each examples of HDR image 298. Each local-scale map 345(1-4) is an example of local-scale map 245 and smoothed scale map 247. Each exposure configuration 390(1-4) is an example of applied exposure configuration 190. Each exposure configuration 390(2-4) is an example of refined exposure configuration 290.

Each local-scale map 345 has a number of regions S(S=108 in this example), in which each region has one of a plurality of scale factors 314(1, 2, . . . , S). Scale factors 314 are examples of scale factors 214, FIG. 2. Each exposure configuration 390 has R regions, in which each region has one of a plurality of exposure levels 392(1-4), which are examples of refined exposure levels 292, FIG. 2. Each of captured images 310-340 has a respective plurality of pixel values 316, 326, 336, and 346. Pixel values 316 are an example of first pixel values 194. Pixel values 326, 336, and 346 are each examples of first pixel values 194 and second pixel-values 294. Each of captured images 310-340 also has a plurality of regions, which are examples of regions 197.

For local-scale maps 345(1-4), scale-factor count S is equal to one, two, three, and four, respectively. Each region of local-scale map 345(1) has a scale factor equal to scale factor 314(1), illustrated by a diagonal-hatching fill in FIG. 3. Accordingly, all regions of captured image 310 have a same exposure level 192. Captured image 310 is, for example, captured when pixel array 134A is in applied exposure configuration 190, in which all exposure levels 192 are equal.

Each region of local-scale map 345(2) has a scale factor equal to one of two scale factors 314(1,2), the latter of which is illustrated by a dotted pattern-fill in FIG. 3. Captured image 320 includes two regions 321 and 322, which correspond to where local-scale map 345(2) has scale factors 314(1) and 314(2), respectively. Accordingly, each region 321-322 of captured image 320 has an exposure level 192 equal to one of two exposure-level values 392(1,2). Captured image 320 is, for example, captured when pixel array 134A is in refined exposure configuration 290, which has refined exposure levels 292. Each refined exposure level 292(i) may be proportional to a product of applied exposure level 192(j) and the one of scale factors 214 associated with pixel subarray 234(i).

Each region of local-scale map 345(3) has a scale factor equal to one of three scale factors 314(1,2,3), the latter of which is illustrated by a cross-hatched fill in FIG. 3. Captured image 330 includes three regions 331, 332, and 333, which correspond to where local-scale map 345(3) has scale factors 314(1), 314(2), and 314(3), respectively. Accordingly, each region 331-333 of captured image 330 has an exposure level 192 equal to one of three exposure-level values 392(1-3).

Each region of local-scale map 345(4) has a scale factor equal to one of four scale factors 314(1,2,3,4), the latter of which is illustrated by a white fill in FIG. 3. Captured image 340 includes four regions 341, 342, 343, and 344, which correspond to where local-scale map 345(4) has scale factors 314(1), 314(2), 314(3), and 314(4), respectively. Accordingly, each region 341-344 of captured image 340 has an exposure level 192 equal to one of four exposure-level values 392(1-4).

The effect of scale-factor smoother 227 on a local-scale map 245 is to erode transitions from smaller scale factors to larger scale factors. For example, scale factors 214 are {1, 2, 4}, and a one-dimensional local-scale map is [1 1 1 2 2 2 4 4 4]. The underlined fourth entry and seventh entry are between local-scale map regions of different values. A one-block-width protection band applied to this local-scale map reduces the scale map value of the underlined fourth entry and seventh entry, which yields a smoothed scale map [1 1 1 1 2 2 2 4 4].

Figure 4:
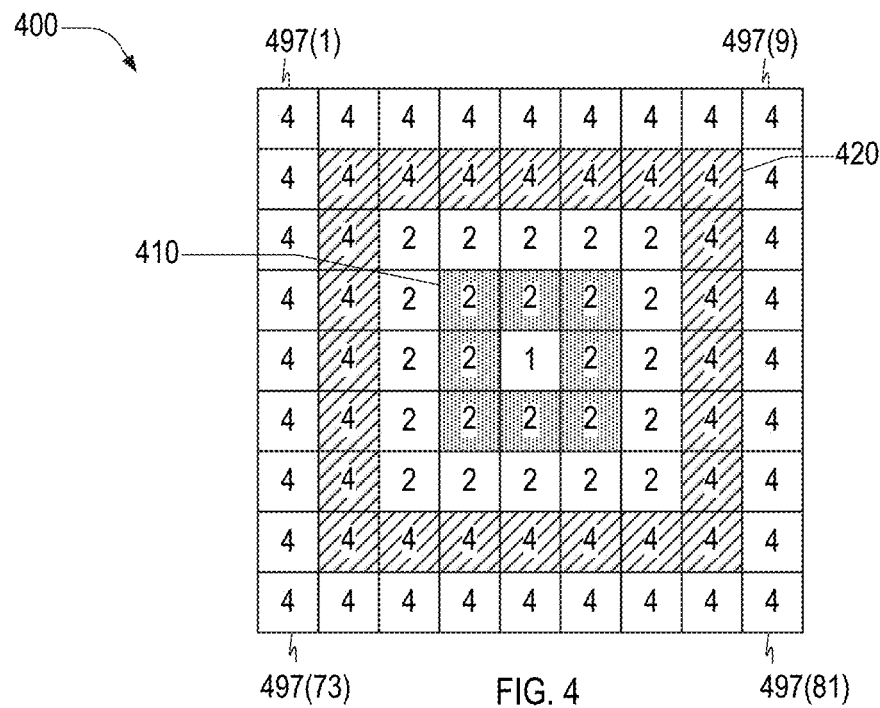
FIGS. 4 and 5 illustrate examples of smoothing of a two-dimensional scale map via a protection band.
Figure 5:
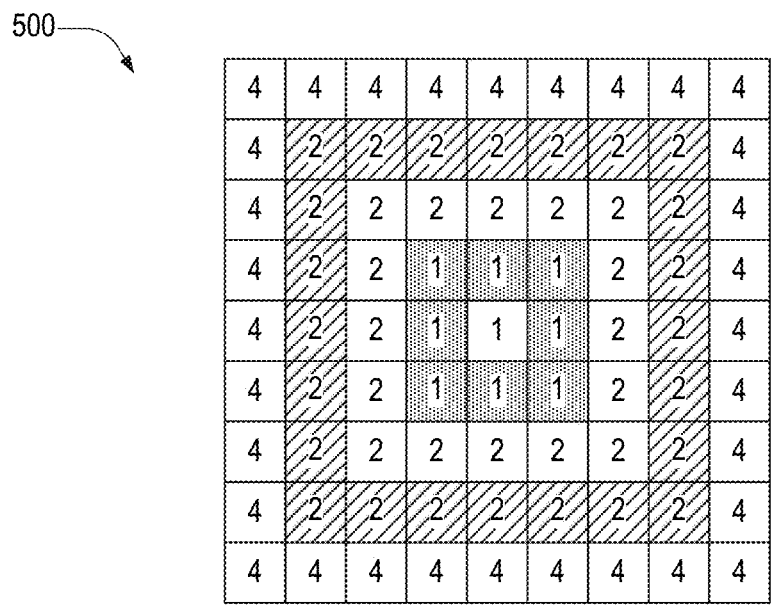

FIGS. 4 and 5 illustrate smoothing of a two-dimensional scale map via a protection band. FIG. 4 depicts a nine-by-nine local-scale map 400 that has a plurality of regions 497 arranged in a nine-by-nine array. Each region 497 is an example of one region 197 and has a scale factor equal to one of one, two, and four. Local-scale map 400 is an example of local-scale map 245 and its scale factors are examples of scale factors 214. Local-scale map 400 includes a protection band 410 that defines a boundary between a region with scale value equal to one and a first annular region having all scale values equal two. Local-scale map 400 also includes a protection band 420 that defines a boundary between the first annular region and a second annular region having all scale values equal to four. FIG. 5 depicts a smoothed scale map 500, which results from scale-factor smoother 227 operating on local-scale map 400. Smoothed scale map 500 is an example of smoothed scale map 247 and is identical to local-scale map 400 except that scale factors of protection bands 410 and 420 are reduced to one and two, respectively.

In this example, scale-factor smoother 227 functions to dilate scale factors located within the protection bands, which is beneficial for removing image artifacts caused by motion in a scene that occurs between capture of successive captured images 296. An example of such motion is imaged object that is moving from a region having a lower scale factor to a region having a larger scale factor, in which case the image of the object is over-exposed.

Figure 6:
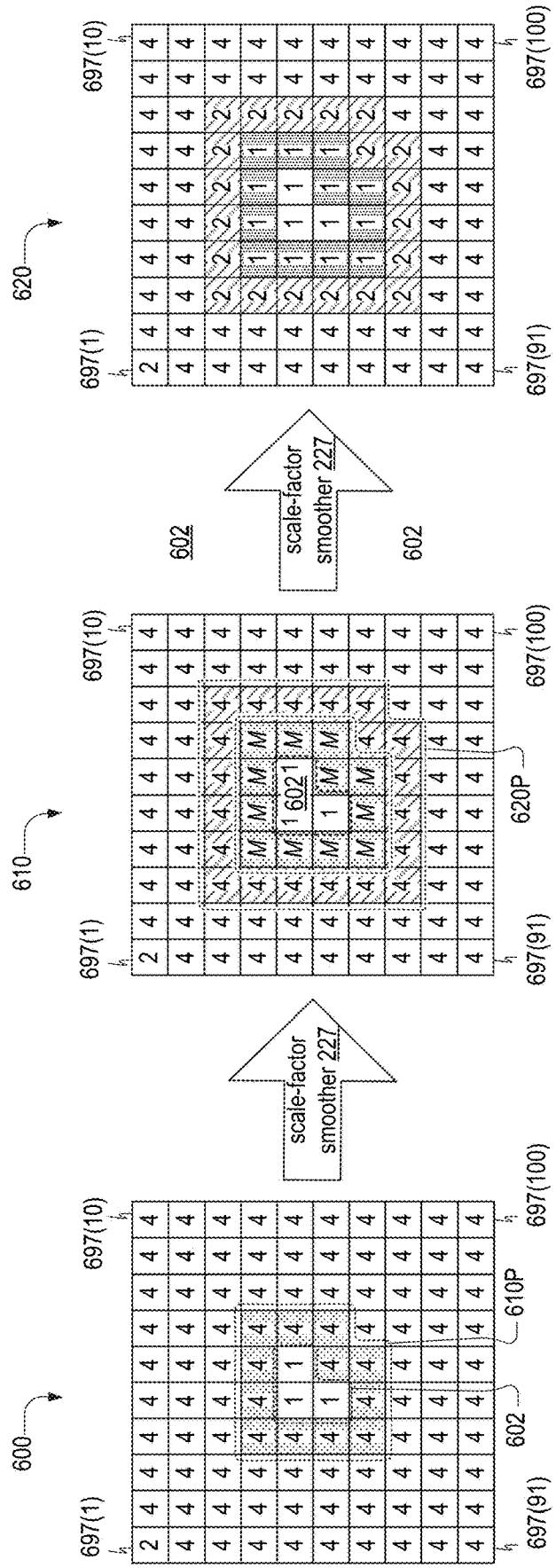
FIG. 6 illustrates an example local-scale map output by the scale-map generator of the exposure selector of FIG. 2.

FIG. 6 illustrates a local-scale map 600 and smoothed scale maps 610 and 620. Smoothed scale maps 610 and 620 result from minimizing differences between adjacent scale values of local-scale map 600. A benefit of minimizing such differences is to remove large changes in signal-to-noise ratio in adjacent regions 197. Local-scale map 600 and smoothed scale maps 610,620 are examples of local-scale map 245 and smoothed scale map 247, respectively. Local-scale map 600 includes a ten-by-ten array of regions 697 each having a scale factor equal to one of three scale-factors $a_1=1$, $a_2=2$, and $a_3=4$, where subscripts denote a scale-factor level j, where $1 \leq j \leq 3$. Herein, the terms scale-factor level and scale-factor index are used interchangeably. The scale factors are examples of scale factor 214. Regions 697 are examples of regions 197. Local-scale map 600 includes a scale-factor region 602 formed by regions 697(45, 46, 55). Scale-factor region 602 has scale-factor levels ($a_1=1$) that differ from surrounding scale-factor levels ($a_3=4$) by more than one scale-factor level. That is, $\Delta j=2$.

Regions 697 surrounding scale-factor region 602 constitute a protection band 610P. Scale-factor smoother 227 may smooth a local-scale map by changing scale factors of protection band 610P such that its scale-factor level j differs from surrounding scale-factor levels by at most one level; that is, when scale-factors factor $a_j$ satisfies $a_{j-1} < a_j < a_{j+1}$. For example, scale-factor smoother 227 smooths local-scale map 600 by changing scale factors of protection band 610P to a scale-factor M, as shown in smoothed scale map 610. A scale-factor M may equal either or one or two. Smoothed scale map 610 includes a protection band 620P.

Scale-factor smoother 227 may operate on a local-scale map iteratively. For example, when M=1, scale-factor smoother 227 operates on smoothed scale map 610 to yield smoothed scale map 620, in which the scale-factors of protection band 620P are changed from $a_3=4$ to $a_2=2$.

Figure 7:
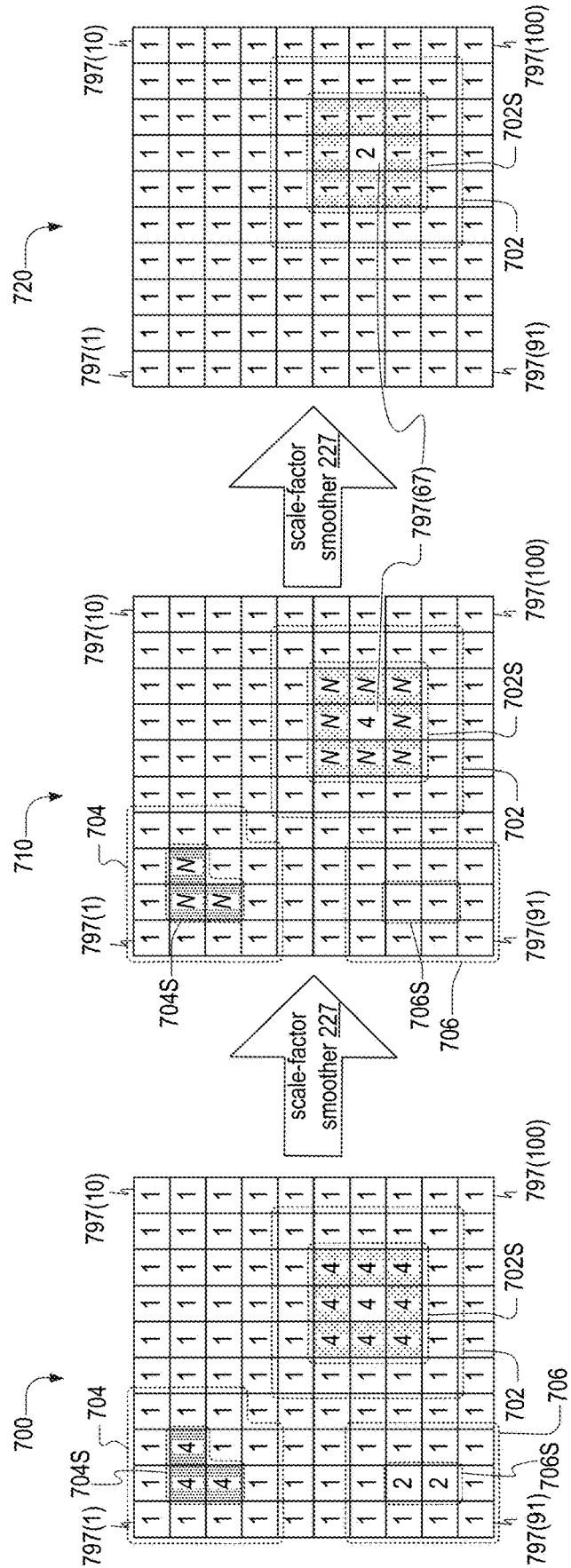
FIG. 7 illustrates an example smoothed scale map resulting from minimizing differences between adjacent scale values of local-scale map of FIG. 6.

FIG. 7 illustrates a local-scale map 700 and a smoothed scale map 710. Smoothed scale map 710 results from minimizing differences between adjacent scale values of local-scale map 700. Local-scale map 700 and smoothed scale map 710 are examples of local-scale map 245 and smoothed scale map 247, respectively. Local-scale map 700 includes a ten-by-ten array of regions 797 each having a scale factor equal to one of the three scale-factors $a_1$, $a_2$, and $a_3$ introduced with local-scale map 600. The scale factors are examples of scale factor 214. Regions 797 are examples of regions 197. Local-scale map 700 includes a scale-factor regions 702 and 704 that include twelve and sixteen scale-map regions 797 respectively. Regions 797 of scale-factor regions 702 and 704 have scale factors $a_1=1$. Scale-factor regions 702 and 704 surround respective internally-adjacent regions 702S and 704S having scale factors $a_3=4$, such that scale-factors of scale-factor regions 702 and 704 differ from scale-factor levels it surrounds by more than one scale-factor level ($\Delta j=2$).

Scale-factor smoother 227 may smooth a local-scale map by changing scale factors of internally-adjacent regions 702S and 704S that their scale-factor levels j differ from surrounding scale-factor levels by at most one level; that is, when scale-factors factor $a_j$ satisfies $a_{j-1} < a_j < a_{j+1}$. For example, scale-factor smoother 227 smooths local-scale map 700 by changing scale factors of internally-adjacent regions 702S and 704S a scale-factor N, as shown in smoothed scale map 710. Scale-factor N may equal either or one two.

Local-scale map 700 also includes a scale-factor region 706, which includes ten scale-map regions 797. Regions 797 of scale-factor regions 706 have scale factors $a_1=1$. Scale-factor region 706 surrounds internally-adjacent regions 706S and having scale factors $a_2=2$. Scale-factor smoother 227 may smooth a local-scale map by changing scale factors of internally-adjacent regions 706S to equal the scale-factor of scale-factor region 706 ($a_1=1$), as shown in smoothed scale map 710.

Scale-factor smoother 227 may operate on local-scale map 700 iteratively. Internally-adjacent region 702S has its own internally-adjacent region, which is a single scale-map region 797: region 797(67). When N=1, scale-factor smoother 227 may operate on smoothed scale map 710 to yield a smoothed scale map 720, in which the scale factor of region 797(67) is changed from $a_3=4$ to $a_1=2$.

Figure 8:
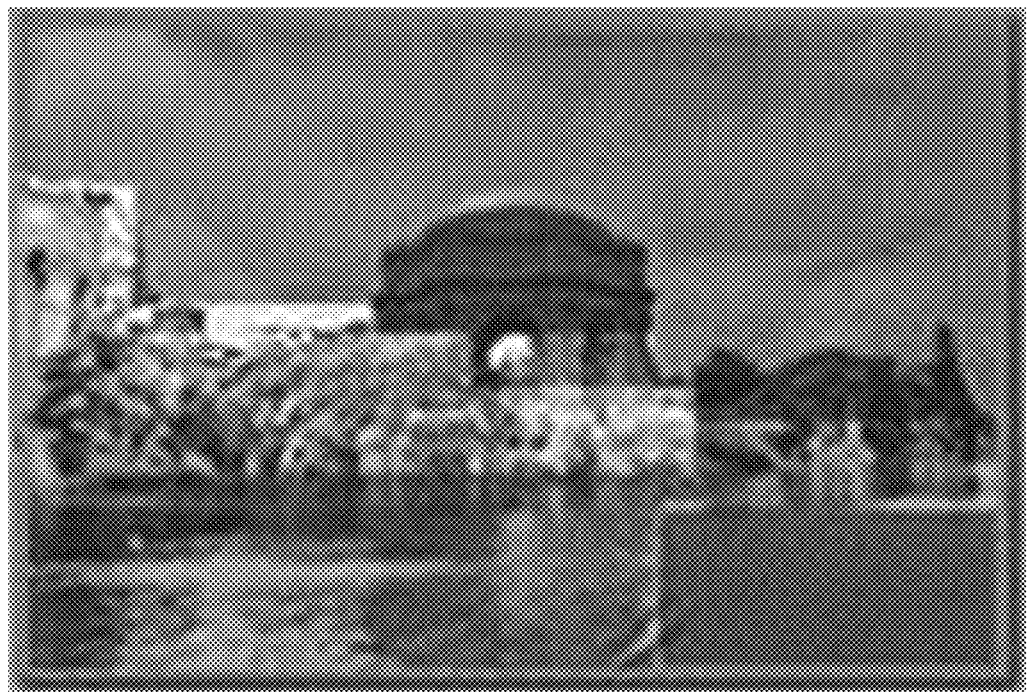
FIG. 8 is an enlarged view of the captured image of FIG. 3.
Figure 9:
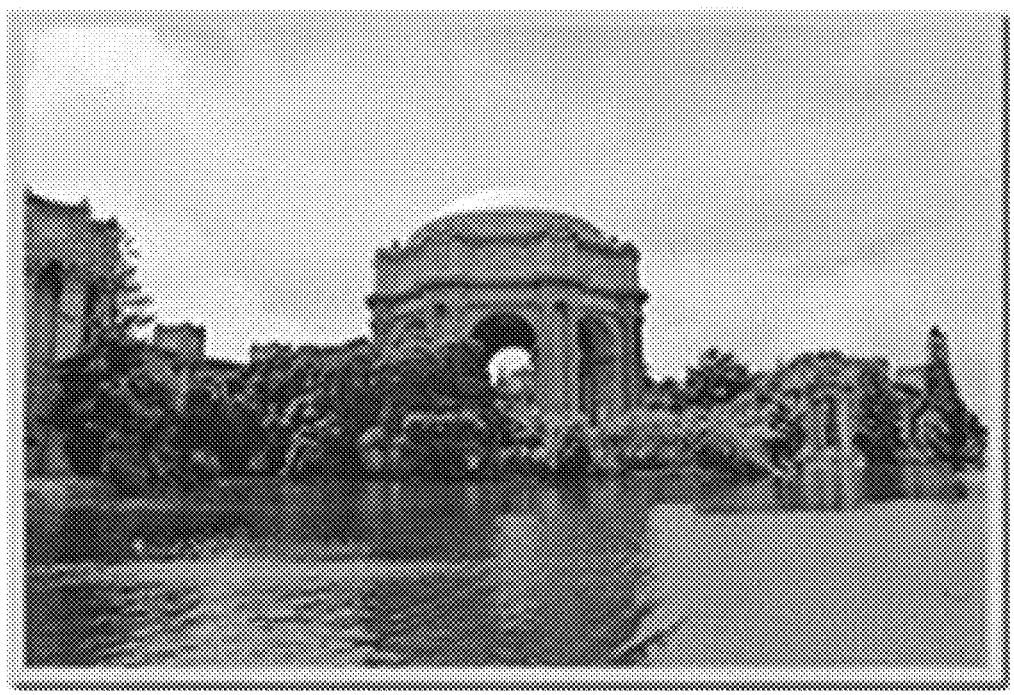
FIG. 9 illustrates an example HDR image resulting from scaling the pixel values of the captured image of FIG. 8.

FIG. 8 is an enlarged view of captured image 340 originally presented in FIG. 3, without regions 341-345 superimposed thereon. Pixel values 346 of captured image 340 are examples of pixel-values 294. FIG. 9 shows an HDR image 900, which is an example of HDR image 298, FIG. 2. HDR image 900 results from pixel-value scaler 250 multiplying pixel values of captured image 340 by a scaling factor. In this example, the scaling factor is a quotient of reference scale 251 divided by local divisors 252, local divisors 252 are scale factors 214 of local-scale map 345(4), and reference scale 251 is the largest of scale factors 314(1-4), which equals sixteen in this example.

Figure 10:
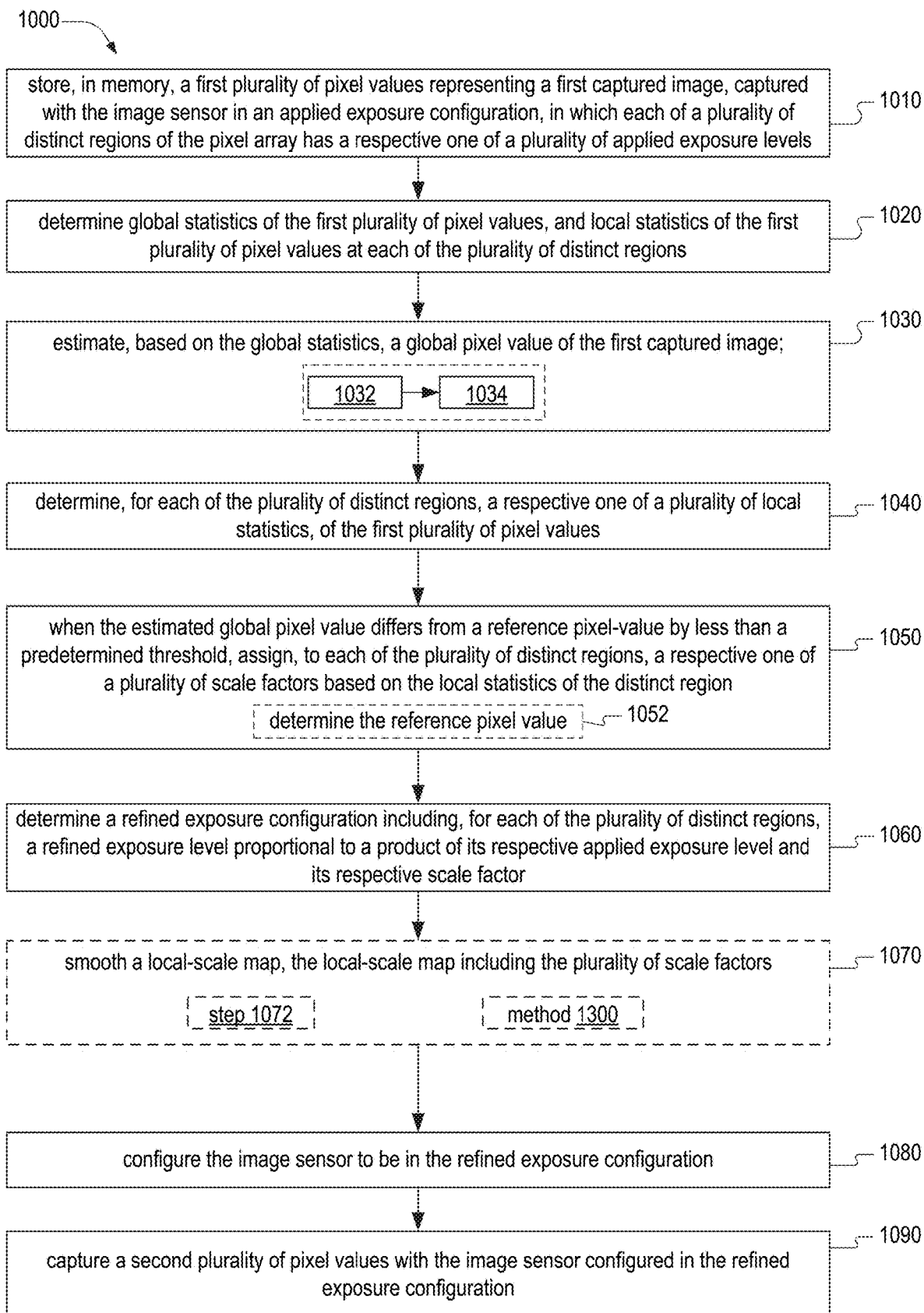
FIG. 10 is a flowchart illustrating a method for determining exposure levels of a pixel array of an image sensor, in an embodiment.

HDR image 298 may be further processed by tone mapper 260, for example, such that HDR image 298 has a tone curve configured for a particular type of display. Tone mapper 260 may employ at least one of a global tone-mapping method, such as gamma compression, and a local tone-mapping method FIG. 10 is a flowchart illustrating a method 1000 for determining exposure levels of a pixel array of an image sensor. Method 1000 is, for example, implemented within one or more aspects of exposure-level controller 200. For example, method 1000 is implemented by microprocessor 202 executing computer-readable instructions of software 220. Method 1000 includes at least one of steps 1010, 1020, 1030, 1040, 1050, 1060, 1070, 1080, and 1090.

Step 1010 includes storing, in memory, a first plurality of pixel values representing a first captured image, captured with the image sensor in an applied exposure configuration, in which each of a plurality of distinct regions of the pixel array has one of a plurality of first exposure levels. In an example of step 1010, image sensor 132 captures captured image 310, FIG. 3, which has pixel values 316.

Step 1020 includes determining global statistics of the first plurality of pixel values. In an example of step 1020, global statistics generator 222 determines global statistics 242 from pixel values 316 of captured image 310.

Step 1030 includes estimating, based on the global statistics, a global pixel value of the first captured image. In an example of step 1030, global statistics generator 222 estimates global pixel-value 242G from global statistics 242.

Step 1040 includes determining, for each of the plurality of distinct regions, a respective one of a plurality of local statistics, of the first plurality of pixel values. In an example of step 1040, local statistics generator 224 determines, for each pixel subarray 234($i$), local statistics 244($i$) from pixel values 316, where $1 \leq i \leq R$.

Step 1050 includes, when the estimated global pixel value differs from a reference pixel-value by less than a predetermined threshold, assigning, to each of the plurality of distinct regions, a respective one of a plurality of scale factors based on the local statistics of the distinct region. In example of step 1050, when global pixel-value 242G differs from reference pixel-value 212 by less than difference threshold 213, scale-map generator 225 assigns, for each pixel subarray 234(*i*), one of scale factors 214 based on local statistics 244(*i*). Examples of scale factors 214 include scale factors 314(1-4), FIG. 3.

Step 1060 includes determining a refined exposure configuration including, for each of the plurality of distinct regions, a second exposure level proportional to a product of its respective first exposure level and its respective scale factor. In an example of step 1060, exposure configuration generator 228 determines refined exposure configuration 290. Examples of refined exposure configuration 290 include exposure configurations 390(2), 390(3), and 390(4), FIG. 3.

Step 1070 applies when the plurality of distinct regions forms a first m×n array, the plurality of scale-factors consisting of factors $\{a_1, a_2, \ldots, a_S\}$. These factors satisfy $a_{j-1} < a_j < a_{j+1}$ and integer scale-factor index j satisfies $1 \leq j \leq S$, and forming a local-scale map having a number of map-regions arranged in a second m×n array. Step 1070 includes smoothing the local-scale map. In a first example of step 1070, scale-factor smoother 227 smooths local-scale map 400, FIG. 4, which results in smoothed scale map 500, FIG. 5. In a second example of step 1070, scale-factor smoother 227 smooths local-scale map 600, FIG. 6, which results in at least one of smoothed scale maps 610 and 620. In a third example of step 1070, scale-factor smoother 227 smooths local-scale map 700, FIG. 7, which results in smoothed scale map 710.

Step 1080 includes configuring the image sensor to be in the refined exposure configuration. In an example of step 1080, exposure configuration updater 229 configures image sensor 132 to be in refined exposure configuration 290 by setting applied exposure configuration 190 to equal refined exposure configuration 290. Examples of refined exposure configuration 290 include exposure configurations 390(2-4).

Step 1090 includes capturing a second plurality of pixel values with the image sensor configured in the refined exposure configuration. In a general example of step 1090, applied exposure configuration 190 equals refined exposure configuration 290, and image sensor 132 captures pixel-values 294.

In a first specific example of step 1090, exposure configuration updater 229 sets applied exposure configuration 190 equal to exposure configuration 390(2) in step 1080, and image sensor 132 captures pixel values 326, which correspond to captured image 320. In a second specific example of step 1090, exposure configuration updater 229 sets applied exposure configuration 190 equal to exposure configuration 390(3) in step 1080, image sensor 132 captures pixel values 336, which correspond to captured image 330. In a third specific example of step 1090, exposure configuration updater 229 set applied exposure configuration 190 equal to exposure configuration 390(4) in step 1080, and image sensor 132 captures pixel values 346, which correspond to captured image 340.

Figure 11:
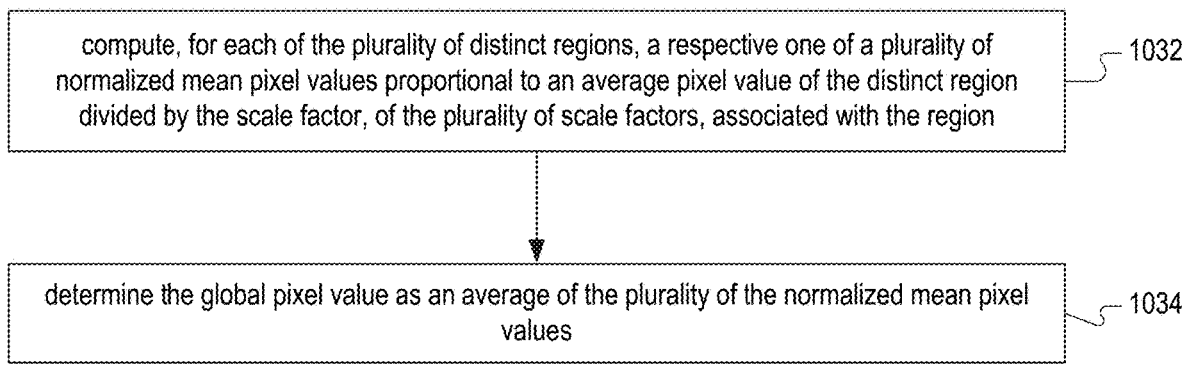
FIG. 11 is a flowchart illustrating steps for estimating a global pixel value of the method of FIG. 10, in an embodiment.

When the first captured image is captured with the refined exposure configuration based in part on the plurality of scale factors, step 1030 may include steps 1032 and 1034, shown in FIG. 11. Step 1032 includes computing, for each of the plurality of distinct regions, a respective one of a plurality of normalized mean pixel values proportional to an average pixel value of the distinct region divided by the scale factor, of the plurality of scale factors, associated with the region. In an example of step 1032, global statistics generator 222 computes, for each pixel subarray 234(*i*), a normalized mean pixel-value 242M(i) that is proportional, e.g., equal, to an average pixel value of pixel subarray 234(*i*) divided by applied exposure level 192(*i*).

Step 1034 includes determining the global pixel value as an average of the plurality of the normalized mean pixel values. In an example of step 1034, global statistics generator 222 determines global pixel-value 242G as an average of mean pixel-values 242M.

Figure 12:
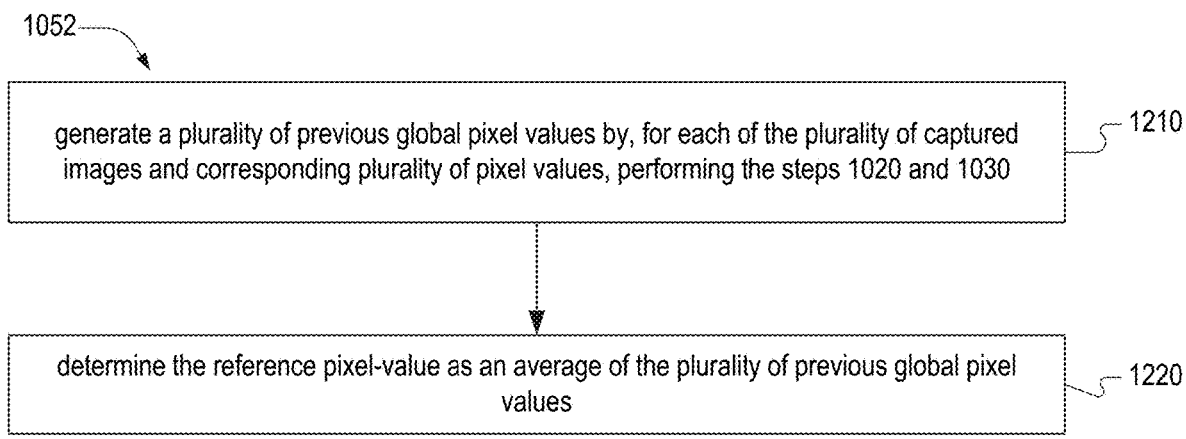
FIG. 12 is a flowchart illustrating steps for determining reference a pixel value of the method of FIG. 10, in an embodiment.

In an embodiment, the first plurality of pixel values may be a most-recently captured plurality of pixel values, and the first captured image may be a most recent captured image of a plurality of captured images, where each of the plurality of captured images corresponding to a respective plurality of pixel values. In such an embodiment, step 1050 may include a step 1052 of determining the reference pixel value. Step 1052 may include steps 1210 and 1220, shown in FIG. 12.

Step 1210 includes generating a plurality of previous global pixel values by, for each of the plurality of captured images and corresponding plurality of pixel values, performing the steps 1020 and 1030. In an example of step 1210, each of the plurality of captured images corresponds to exposure configuration 390, and hence collectively corresponds to sequentially-captured versions of captured image 330 and corresponding pixel values 336.

Step 1220 includes determining the reference pixel-value as an average of the plurality of previous global pixel values. In an example of step 1220, global statistics generator 222 determines reference pixel-value 212 to be an average of the previous global pixel-values 242G. For example, global statistics generator 222 may periodically update reference pixel-value 212 as a moving average of Q most-recently-captured captured images 296, where Q is a predetermined positive integer.

Step 1070 may include a step 1072, which includes decreasing a maximum difference between scale-map indices of all pairs of adjacent map regions. Adjacent map regions may be side-adjacent and/or corner adjacent.

In a first example of step 1072, scale-factor smoother 227 decreases a maximum difference between scale-map indices of all pairs of adjacent map regions of local-scale map 400, FIG. 4, which results in smoothed scale map 500, FIG. 5. In a second example of step 1072, scale-factor smoother 227 decreases a maximum difference between scale-map indices of all pairs of adjacent map regions of local-scale map 600, FIG. 6, which results in at least one of smoothed scale maps 610 and 620. In a third example of step 1072, scale-factor smoother 227 decreases a maximum difference between scale-map indices of all pairs of adjacent map regions of local-scale map 700, FIG. 7, which results in smoothed scale map 710.

Figure 13:
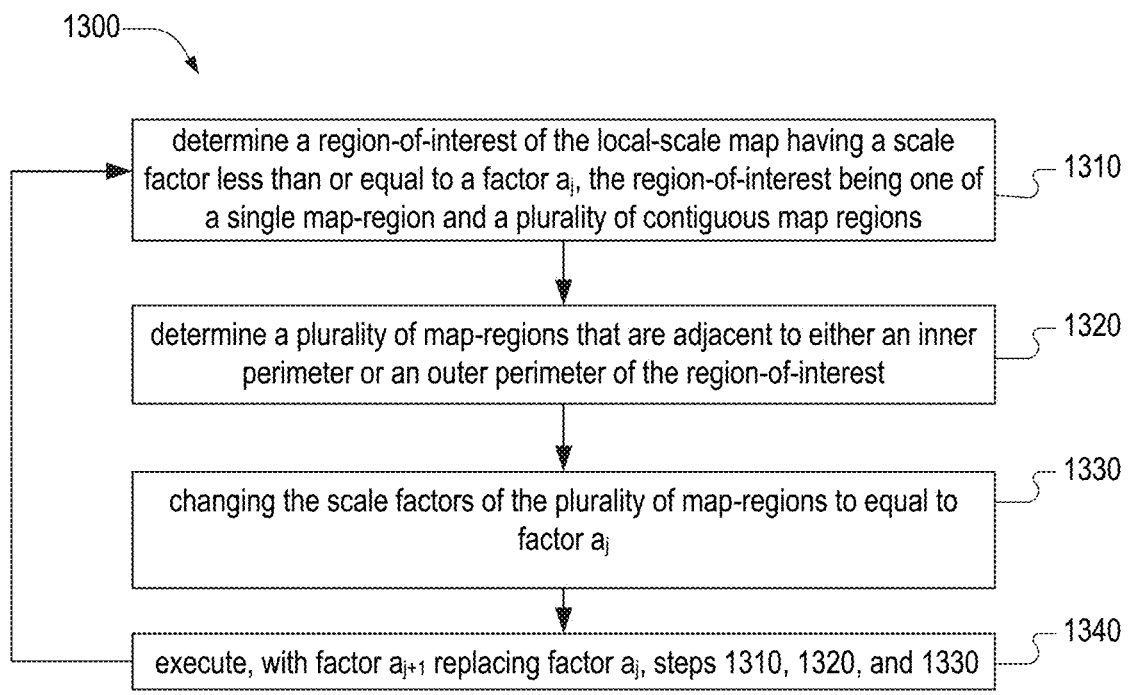
FIG. 13 is a flowchart illustrating an embodiment of method, which may be included in the method of claim 10, for smoothing a local-scale map.

FIG. 13 is a flowchart illustrating a method 1300 for smoothing a local-scale map, which may be implemented as part of step 1070 of method 1000. Method 1300 includes at least one of steps 1310, 1320, 1330, and 1340.

Step 1310 includes determining a region-of-interest of the local-scale map having a scale factor less than or equal to a factor $a_j$, the region-of-interest being one of a single map-region and a plurality of contiguous map regions. In a first example of step 1310, $a_j = a_1 = 1$ and scale-factor smoother 227 determines scale-factor region 602 of local-scale map 600.

Step 1320 includes determining a plurality of map-regions that are adjacent to either an inner perimeter or an outer perimeter of the region-of-interest. In a first example of step 1320, scale-factor smoother 227 determines protection band 610P, which is an outer perimeter of scale-factor region 602.

Step 1330 includes changing the scale factors of the plurality of map-regions to equal to factor $a_j$. In a first example of step 1330, scale-factor smoother 227 changes scale-factors of regions 697 within protection band 610P to equal $a_1$, such that M=1 in smoothed scale map 610.

Step 1330 may yield a smoothed scale map. Step 1340 includes executing, with the smoothed scale map replacing the scale map and factor $a_{j+1}$ replacing factor $a_j$, steps 1310, 1320, and 1330. In a first example of step 1340, factor $a_2=2$ replaces factor $a_1=1$, and scale-factor smoother 227 changes, in smoothed scale map 610, scale-factors of regions 697 within protection band 620P equal to $a_2$ to yield smoothed scale map 620.

Exposure-level controller 200 may implement method 1300 to generate smoothed scale map 710 from local-scale map 700. In a second example of step 1310, $a_j=a_1=1$ and scale-factor smoother 227 determines scale-factor regions 702, 704, and 706 of local-scale map 700. In a second example of step 1320, scale-factor smoother 227 determines internally-adjacent regions 702S, 704S, and 706S, which are examples of inner perimeters. In a second example of step 1330, scale-factor smoother 227 changes scale-factors of regions 797 within internally-adjacent regions 702S, 704S, and 706S to equal $a_1$, such that N=1 in smoothed scale map 710.

In a second example of step 1340, factor $a_2=2$ replaces factor $a_1=1$, and scale-factor smoother 227 changes the scale-factor of region 797(67) from four to equal to $a_2$, which equals two in this example.

Figure 14:
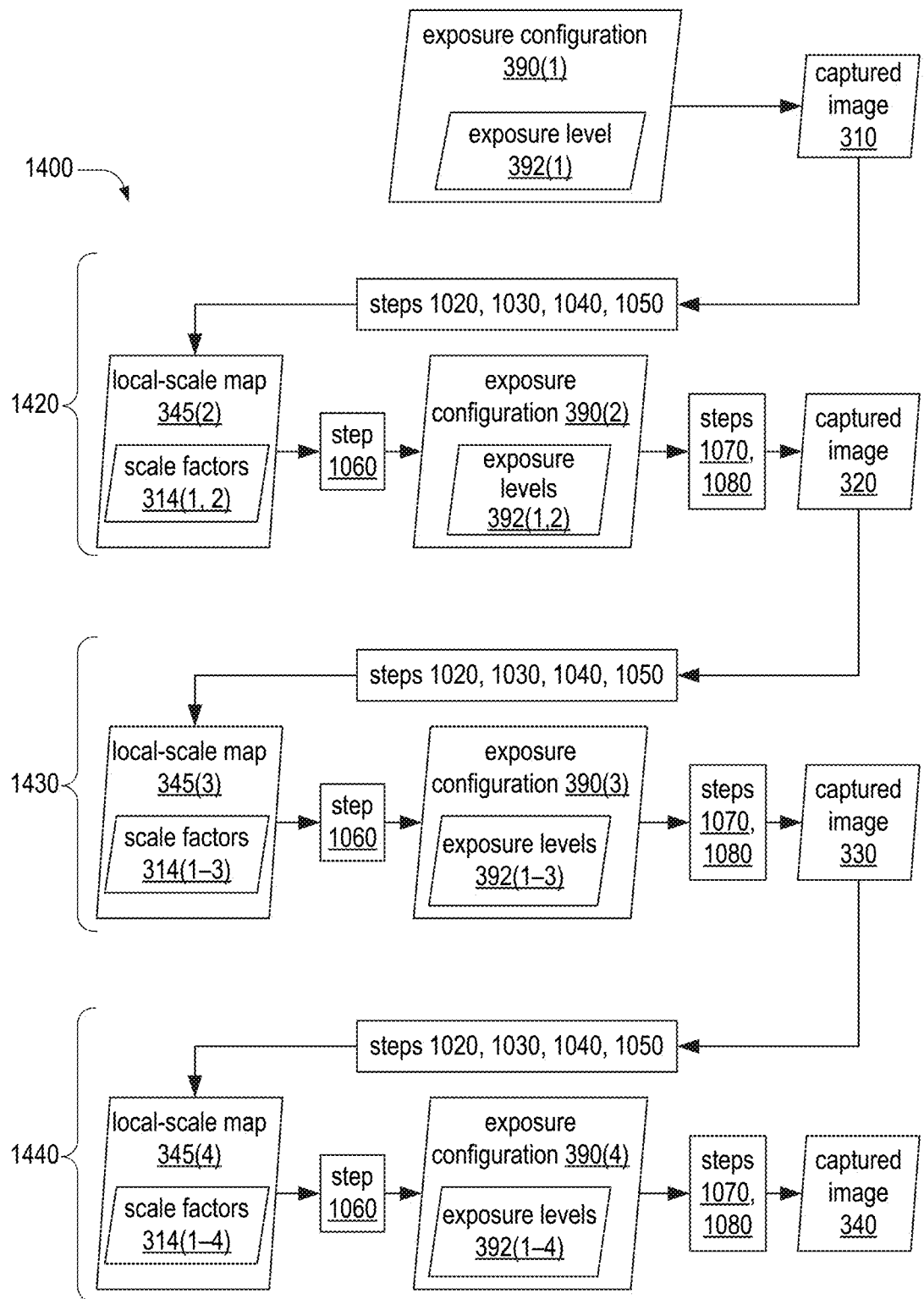
FIG. 14 is a functional block diagram illustrating iterative execution of the method of FIG. 10, in an embodiment.

Method 1000 may run iteratively. For example, FIG. 14 is a functional block diagram illustrating iterative execution 1400 of method 1000 to generate captured images 310-340 of FIG. 3. Iterative execution 1400 includes iterations 1420, 1430, and 1440, which produce respective captured images 320, 330, and 340.

Iteration 1420 may also produce captured image 320; iteration 1430 may also produce captured image 330; iteration 1440 may also produce captured image 340. Iterative execution 1400 may lack one of iterations 1420, 1430, and 1440 without departing from the scope hereof. Iterative execution 1400 may include additional iterations, for example, to produce captured images and HDR images from exposure configurations having more than four exposure levels.

Combinations of Features

Features described above as well as those claimed below may be combined in various ways without departing from the scope hereof. The following examples illustrate some possible, non-limiting combinations:

(A1) A method for determining exposure levels of a pixel array of an image sensor includes steps of (a) storing, in memory, a first plurality of pixel values representing a first captured image, captured with the image sensor in an applied exposure configuration, in which each of a plurality of distinct regions of the pixel array has one of a plurality of first exposure levels, (b) determining global statistics of the first plurality of pixel values, (c) estimating, based on the global statistics, a global pixel value of the first captured image, and (d) determining, for each of the plurality of distinct regions, a respective one of a plurality of local statistics, of the first plurality of pixel values. When the estimated global pixel value differs from a reference pixel-value by less than a predetermined threshold, the method includes (e) assigning, to each of the plurality of distinct regions, a respective one of a plurality of scale factors based on the local statistics of the distinct region. The method also includes (f) determining a refined exposure configuration including, for each of the plurality of distinct regions, a second exposure level proportional to a product of its respective first exposure level and its respective scale factor, and (g) capturing a second plurality of pixel values with the image sensor configured in the refined exposure configuration.

(A2) In the method denoted by (A1), the plurality of distinct regions may be larger in number than the plurality of scale factors such that two distinct regions of the plurality of distinct regions correspond to a same scale factor of the plurality of scale factors.

(A3) In any method denoted by one of (A1) and (A2), when the plurality of distinct regions forms a first m×n array, the plurality of scale factors consists of factors $\{a_1, a_2, \ldots, a_S\}$ where $a_{j-1} < a_j < a_{j+1}$ and integer scale-factor index $1 \leq j \leq S$, and forms a local-scale map having a number of map-regions arranged in a second m×n array, the method may further include: decreasing a maximum difference between scale-map indices of all pairs of adjacent map regions.

(A4) In the method denoted by (A3), the decreasing a maximum difference may results in the maximum difference being equal to one.

(A5) In any method denoted by one of (A1) through (A4), determining global statistics may include determining a global mean value of the first plurality of pixel values.

(A6) In any method denoted by one of (A1) through (A5), when the first captured image is captured with the refined exposure configuration based in part on the plurality of scale factors, the estimating the global pixel value may include: (a) computing, for each of the plurality of distinct regions, a respective one of a plurality of normalized mean pixel values proportional to an average pixel value of the distinct region divided by the scale factor, of the plurality of scale factors, associated with the region, and (b) determining the global pixel value as an average of the plurality of the normalized mean pixel values.

(A7) In any method denoted by one of (A1) through (A6), the estimating the global pixel value may include executing an exposure metering technique including at least one of spot metering, partial area metering, center-weighted average metering, and multi-zone metering.

(A8) When the first plurality of pixel values is a most-recently captured plurality of pixel values, the first captured image is a most-recently captured image of a plurality of captured images, and each of the plurality of captured images corresponds to a respective plurality of pixel values, any method denoted by one of (A1) through (A7) may further include: (a) generating a plurality of previous global pixel values by, for each of the plurality of captured images and corresponding plurality of pixel values, performing the steps of determining and estimating, and (b) determining the reference pixel-value as an average of the plurality of previous global pixel values.

(A9) In any method denoted by one of (A1) through (A8), when the first plurality of pixel values has a bit depth n, the plurality of distinct regions includes a first region having (a) a first local statistics of the plurality of local statistics and (b) a first scale factor of the plurality of scale factors, the first local statistics may include a statistical maximum pixel value of the first region, the first scale factor being less than $(2^n-1)$ divided by the statistical maximum pixel value.

(A10) In any method denoted by one of (A1) through (A9), when the pixel array includes a plurality of sensor pixels each having a pixel charge corresponding to a respective intensity of light from a scene incident thereon, the capturing the first captured image may include: (a) converting, with an analog-to-digital converter, each pixel charge to a respective one of the first plurality of pixel values, and (b) storing the first digital pixel values in the memory communicatively coupled to a microprocessor configured to execute the steps of determining, and estimating.

(A11) In any method denoted by one of (A1) and (A2), when the plurality of distinct regions forms a first m×n array, the plurality of scale factors consists of factors $\{a_1, a_2, \ldots, a_S\}$ where $a_{j-1}<a_j<a_{j+1}$ and integer scale-factor index $1 \leq j \leq S$, and forms a local-scale map having a number of map-regions arranged in a second m×n array, the method may further include: (i) determining a region-of-interest of the local-scale map having a scale factor less than or equal to a factor $a_j$, the region-of-interest being one of a single map-region and a plurality of contiguous map regions; (ii) determining a plurality of map-regions that are adjacent to either an inner perimeter or an outer perimeter of the region-of-interest; and (iii) changing the scale factors of the plurality of map-regions to equal to factor $a_j$.

(A12) The method denoted by (A11), in which the step of changing yields a smoothed scale map, may further include, with the smoothed scale map replacing the local-scale map and factor $a_{j+1}$ replacing factor $a_j$, repeating the steps of determining and changing.

(B1) An exposure controller for capturing a high-dynamic range image includes a memory and a microprocessor. The memory stores non-transitory computer-readable instructions and is adapted to store the high-dynamic range image. The microprocessor is adapted to execute the instructions to implement any of the methods denoted by one of (A1) through (A12).

(B2) In the exposure controller denoted by (B1), the plurality of distinct regions may be larger in number than the plurality of scale factors such that two distinct regions of the plurality of distinct regions correspond to a same scale factor of the plurality of scale factors.

(B3) In any exposure controller denoted by one of (B1) and (B2), the plurality of distinct regions may form a first m×n array, the plurality of scale factors may consist of factors $\{a_1, a_2, \ldots, a_S\}$ where $a_{j-1}<a_j<a_{j+1}$ and integer scale-factor index $1 \leq j \leq S$, and may form a local-scale map having a number of map-regions arranged in a second m×n array.

(B4) In any exposure controller denoted by one of (B1) through (B3), the first plurality of pixel values may be a most-recently captured plurality of pixel values, the first captured image may be a most-recently captured image of a plurality of captured images, and each of the plurality of captured images may correspond to a respective plurality of pixel values.

(B5) In any exposure controller denoted by one of (B1) through (B4), in which the first plurality of pixel values has a bit depth n, the plurality of distinct regions includes a first region having (a) a first local statistics of the plurality of local statistics and (b) a first scale factor of the plurality of scale factors, the first local statistics including a statistical maximum pixel value of the first region, the first scale factor may be less than $(2^n-1)$ divided by the statistical maximum pixel value.

Changes may be made in the above exposure controllers and methods for determining exposure levels without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present exposure controllers and methods for determining exposure levels, which, as a matter of language, might be said to fall therebetween.

What is claimed is:

1. A method for determining exposure levels of a pixel array of an image sensor, the method comprising:
   storing, in memory, a first plurality of pixel values representing a first captured image, captured with the image sensor in an applied exposure configuration, in which each of a plurality of distinct regions of the pixel array has one of a plurality of first exposure levels;
   determining global statistics of the first plurality of pixel values;
   estimating, based on the global statistics, a global pixel value of the first captured image;
   determining, for each of the plurality of distinct regions, a respective one of a plurality of local statistics, of the first plurality of pixel values;
   when the estimated global pixel value differs from a reference pixel-value by less than a predetermined threshold, assigning, to each of the plurality of distinct regions, a respective one of a plurality of scale factors based on the local statistics of the distinct region;
   determining a refined exposure configuration including, for each of the plurality of distinct regions, a second exposure level proportional to a product of its respective first exposure level and its respective scale factor; and
   capturing a second plurality of pixel values with the image sensor configured in the refined exposure configuration.

2. The method of claim 1, the plurality of distinct regions being larger in number than the plurality of scale factors such that two distinct regions of the plurality of distinct regions correspond to a same scale factor of the plurality of scale factors.

3. The method of claim 1, the plurality of distinct regions forming a first m×n array, the plurality of scale factors consisting of factors $\{a_1, a_2, \ldots, a_S\}$ where $a_{j-1}<a_j<a_{j+1}$ and integer scale-factor index $1 \leq j \leq S$, and forming a local-scale map having a number of map-regions arranged in a second m×n array, the method further comprising:
   decreasing a maximum difference between scale-map indices of all pairs of adjacent map regions.

4. The method of claim 3, the decreasing a maximum difference resulting in the maximum difference being equal to one.

5. The method of claim 1, the determining global statistics including determining a global mean value of the first plurality of pixel values.

6. The method of claim 1, when the first captured image is captured with the refined exposure configuration based in part on the plurality of scale factors, the estimating the global pixel value comprising:
   computing, for each of the plurality of distinct regions, a respective one of a plurality of normalized mean pixel values proportional to an average pixel value of the distinct region divided by the scale factor, of the plurality of scale factors, associated with the region;
   determining the global pixel value as an average of the plurality of the normalized mean pixel values.

7. The method of claim 1, the estimating the global pixel value comprising executing an exposure metering technique including at least one of spot metering, partial area metering, center-weighted average metering, and multi-zone metering.

8. The method of claim 1, the first plurality of pixel values being a most-recently captured plurality of pixel values, the first captured image being a most-recently captured image of a plurality of captured images, each of the plurality of captured images corresponding to a respective plurality of pixel values, and further comprising:

generating a plurality of previous global pixel values by, for each of the plurality of captured images and corresponding plurality of pixel values, performing the steps of determining and estimating;

determining the reference pixel-value as an average of the plurality of previous global pixel values.

9. The method of claim 1, the first plurality of pixel values having a bit depth n, the plurality of distinct regions including a first region having (a) a first local statistics of the plurality of local statistics and (b) a first scale factor of the plurality of scale factors, the first local statistics including a statistical maximum pixel value of the first region, the first scale factor being less than $(2^n-1)$ divided by the statistical maximum pixel value.

10. The method of claim 1, the pixel array including a plurality of sensor pixels each having a pixel charge corresponding to a respective intensity of light from a scene incident thereon, the capturing the first captured image comprising:

converting, with an analog-to-digital converter, each pixel charge to a respective one of the first plurality of pixel values; and storing the first digital pixel values in the memory communicatively coupled to a microprocessor configured to execute the steps of determining, and estimating.

11. The method of claim 1, the plurality of distinct regions forming a first m×n array, the plurality of scale factors consisting of factors $\{a_1, a_2, \ldots, a_S\}$ where $a_{j-1} < a_j < a_{j+1}$ and integer scale-factor index $1 \leq j \leq S$, and forming a local-scale map having a number of map-regions arranged in a second m×n array, the method further comprising:

determining a region-of-interest of the local-scale map having a scale factor less than or equal to a factor $a_j$, the region-of-interest being one of a single map-region and a plurality of contiguous map regions;

determining a plurality of map-regions that are adjacent to either an inner perimeter or an outer perimeter of the region-of-interest; and changing the scale factors of the plurality of map-regions to equal to factor $a_j$.

12. The method of claim 11, the step of changing yielding a smoothed scale map, and further comprising, with the smoothed scale map replacing the local-scale map and factor $a_{j+1}$ replacing factor $a_j$, repeating the steps of determining and changing.

13. An exposure controller for capturing a high-dynamic range image comprising:

a memory storing non-transitory computer-readable instructions and configured to store the high-dynamic range image;

a microprocessor configured to execute the instructions to:

store, in the memory, a first plurality of pixel values representing a first captured image, captured with an image sensor in an applied exposure configuration, in which each of a plurality of distinct regions of a pixel array of the image sensor has one of a plurality of first exposure levels;

determine global statistics of the first plurality of pixel values;

estimate, based on the global statistics, a global pixel value of the first captured image;

determine, for each of the plurality of distinct regions, a respective one of a plurality of local statistics, of the first plurality of pixel values;

when the estimated global pixel value differs from a reference pixel-value by less than a predetermined threshold, assign, to each of the plurality of distinct regions, a respective one of a plurality of scale factors based on the local statistics of the distinct region; and determine a refined exposure configuration including, for each of the plurality of distinct regions, a second exposure level proportional to a product of its respective first exposure level and its respective scale factor; and capture a second plurality of pixel values with the image sensor configured in the refined exposure configuration.

14. The exposure controller of claim 13, the plurality of distinct regions being larger in number than the plurality of scale factors such that two distinct regions of the plurality of distinct regions correspond to a same scale factor of the plurality of scale factors.

15. The exposure controller of claim 13, the plurality of distinct regions forming a first m×n array, the plurality of scale factors consisting of factors $\{a_1, a_2, \ldots, a_S\}$ where $a_{j-1} < a_j < a_{j+1}$ and integer scale-factor index $1 \leq j \leq S$, and forming a local-scale map having a number of map-regions arranged in a second m×n array, the microprocessor being further configured to execute the instructions to:

decrease a maximum difference between scale-map indices of all pairs of adjacent map regions.

16. The exposure controller of claim 15, the decreasing a maximum difference resulting in the maximum difference being equal to one.

17. The exposure controller of claim 13, the determining global statistics including determining a global mean value of the first plurality of pixel values.

18. The exposure controller of claim 13, when the first captured image is captured with the refined exposure configuration based in part on the plurality of scale factors, the microprocessor being further configured to, when executing the instructions to estimating the global pixel value:

compute, for each of the plurality of distinct regions, a respective one of a plurality of normalized mean pixel values proportional to an average pixel value of the distinct region divided by the scale factor, of the plurality of scale factors, associated with the region;

determine the global pixel value as an average of the plurality of the normalized mean pixel values.

19. The exposure controller of claim 13, the microprocessor being further configured to, when estimating the global pixel value, execute an exposure metering technique including at least one of spot metering, partial area metering, center-weighted average metering, and multi-zone metering.

20. The exposure controller of claim 13, the first plurality of pixel values being a most-recently captured plurality of pixel values, the first captured image being a most-recently captured image of a plurality of captured images, each of the plurality of captured images corresponding to a respective plurality of pixel values, and the microprocessor being further configured to:

generate a plurality of previous global pixel values by, for each of the plurality of captured images and corresponding plurality of pixel values, performing the steps of determining and estimating;

determine the reference pixel-value as an average of the plurality of previous global pixel values.

21. The exposure controller of claim 13, the first plurality of pixel values being a bit depth n, the plurality of distinct regions including a first region having (a) a first local statistics of the plurality of local statistics and (b) a first scale factor of the plurality of scale factors, the first local statistics including a statistical maximum pixel value of the first region, the first scale factor being less than ($2^n-1$) divided by the statistical maximum pixel value.

22. The exposure controller of claim 13, the pixel array including a plurality of sensor pixels each having a pixel charge corresponding to a respective intensity of light from a scene incident thereon, the microprocessor being further configured to, when capturing the captured image:
- convert, with an analog-to-digital converter, each pixel charge to a respective one of the first plurality of pixel values; and
- store the first digital pixel values in the memory.

* * * * *